Patented Sept. 2, 1947

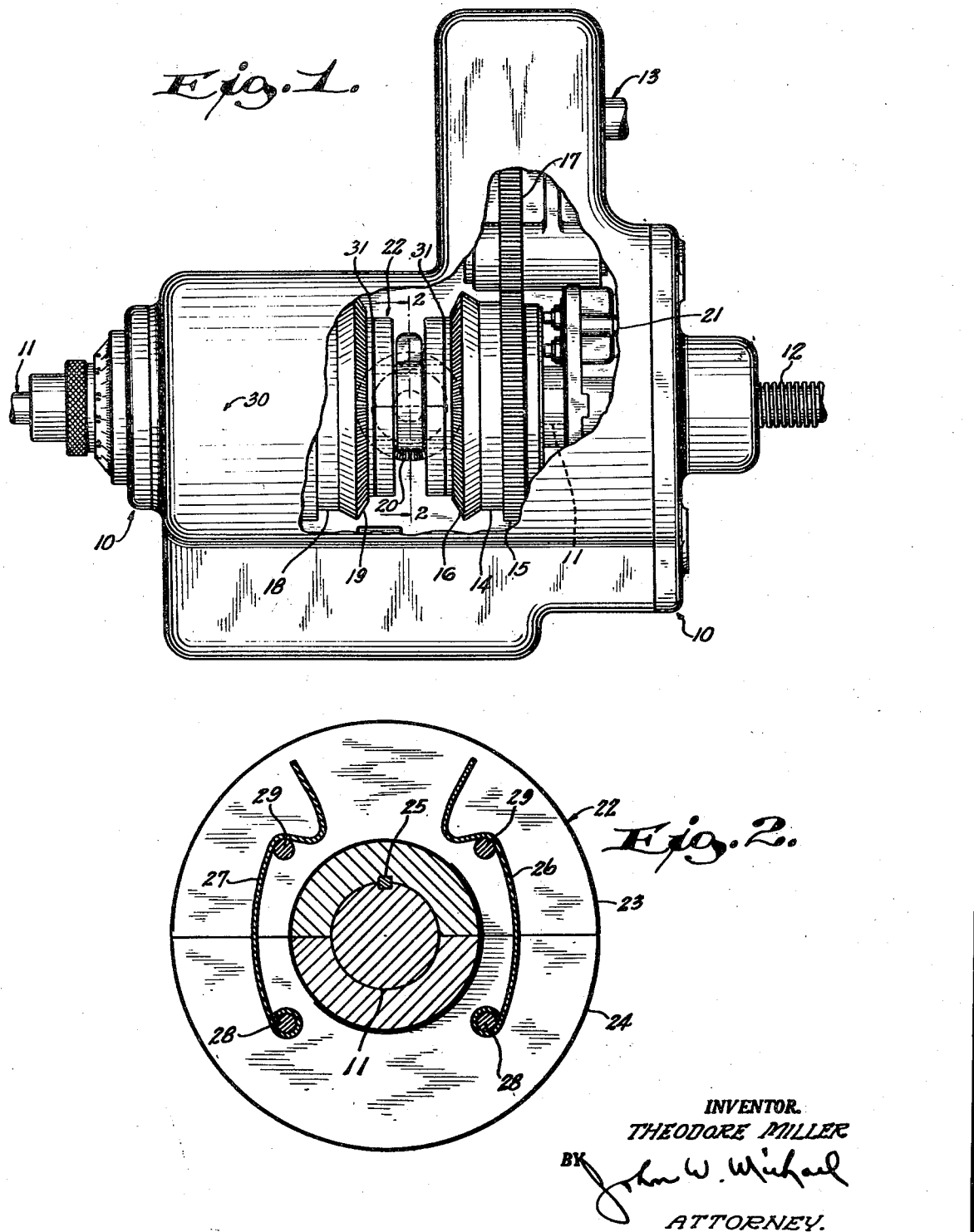

2,426,942

UNITED STATES PATENT OFFICE 2,426,942

MAGNETIC CLUTCH

Theodore Miller, Racine, Wis., assignor to George Gorton Machine Co., Racine, Wis., a corporation of Wisconsin Application November 23, 1944, Serial No. 564,825

7 Claims. (Cl. 192—84)

This invention relates to improvements in magnetic clutches, particularly of the frictional type adapted for either direct or reverse motion.

In order to maintain a proper air gap between the cooperating clutch faces of the rotary armature and magnets, it has been found practical to cover one of each cooperating face with a layer of paper. Paper has a high co-efficient of friction even when in contact with oil and thus it satisfactorily performs both the function of maintaining the proper gap and the elimination of slippage between the clutch faces. However, there is one objectionable feature. Paper has a relatively short period of usefulness. It becomes imbedded with particles of foreign material attracted to the face of the rotary magnets and as a result often becomes glazed, thereby losing its high co-efficient of friction or otherwise becomes destroyed. It is therefore necessary to change the paper face at frequent intervals.

The object of this invention therefore is to provide a magnetic clutch having a rotary armature which can be readily removed and replaced for the purpose of renewing the paper layer on its clutch face without disturbing the other operating elements of the clutch.

This object is obtained by making the rotary armature so that, without the use of tools, it can be removed radially instead of axially from the supporting shaft. This may be accomplished by providing a slot extending radially from the bore of the armature or by making the armature in segments which can be applied to or removed from the main supporting shaft of the clutch in a direction radial thereto. This permits the use of a single shaft for supporting two rotary magnets as well as the rotary armature and still allows the armature to be changed without first removing either of the rotary magnets. The segments may be secured individually to the shaft by the use of fastening means engaging the shaft or a collar permanently fastened thereon, or by clamping the segments one to another to form a sleeve encircling the shaft and keying one or more of the segments to the shaft. In this latter method the clamping may be accomplished by spring snap latches. The forces involved in rotating the armature and main supporting shaft by one of the energized rotary magnets do not have large resulting forces tending to cause the segments to separate, and hence the latches or other resilient means need not be designed for heavy loads. They must, however, be sufficiently strong to keep the segments in place when neither of the rotary magnets is energized, because it is the electro-magnetic force which acts to keep each segment in place as a component part of the whole when the armature is being driven by one of the magnets.

With the foregoing and other objects in view, developed by the following description, the invention consists in certain novel advantageous structural organizations and features, as well as combinations and sub-combinations, as more fully explained hereinafter and specified by the following claims.

Referring to the accompanying drawing forming a part hereof,

Figure 1 is a top plan view of a magnetic clutch with part of the cover broken away to show the rotary magnets and armature embodying the invention; and Figure 2 is an enlarged fragmentary sectional view taken on the line 2—2 of Figure 1.

Without intending to so limit the adaptability of the instant invention, and merely as an example, the invention is shown employed in a magnetic clutch designed for operating feed screws of a machine tool in either direct or reverse motion. However, the invention could just as well be incorporated in magnetic clutches adapted to drive, in either direct or reverse motion, shafts for doing a multiplicity of different types of work, such as operating valves, bombbay doors, landing gear retraction mechanisms, gun turret revolving mechanisms, and many other devices.

Referring in greater detail to the drawings, there is shown a housing 10 in which is revolvably mounted a main supporting shaft 11. The shaft 11 is coupled at one end to the feed screw 12. Power is supplied through a power shaft 13 rotatably mounted in an extension of the housing 10. A magnet member 14 having a ring gear 15 and a bevel gear 16 is rotatably supported on the shaft 11. The ring gear 15 has a driving connection with the shaft 13 through a train of gears designated generally at 17. When the shaft 13 is rotated, the magnet member 14 also rotates freely on the shaft 11. Another magnet member 18, also having a bevel gear 19, is likewise rotatably mounted on the shaft 11 but positioned oppositely from the member 14. A connecting bevel gear 20, mounted on a shaft on the bottom of the housing 10, is in driving connection with each of the bevel gears 16 and 19. When the member 14 is caused to rotate in one direction, the member 18 by reason of the action of the connecting bevel gear 20 will be caused to rotate on the shaft 11 in an opposite direction. Both of the magnetic members 14 and 18 have their respective windings electrically connected by brushes generally illustrated at 21, as is well-known to those skilled in the art. They may be separately energized as desired. Each of the magnetic members is provided with a smooth clutch face which flatly engages with oppositely-related clutch faces on the armature 22.

In the embodiment illustrated, the armature 22 is made in two segments 23 and 24. The segments are joined together to form an armature of spool-like shape positioned on the shaft 11. There are disk-like flanges at each end of the armature which have flat smooth clutch faces oppositely related to the flat smooth clutch faces on the magnetic members 14 and 18. The hub portion of segment 23 and the shaft 11 have key ways to accommodate a key 25 preventing relative rotative movement between them. The segment 24 has its hub portion formed to fit around half the shaft 11. The two segments are held together by spring latches 26 and 27. These latches are formed of heat-treated spring steel and are carried on pins 28 supported in axially aligned openings in each flange of segment 24. The segment 23 is likewise provided with pins 29 supported in axially aligned openings in each flange. The spring snap latches 26 and 27 have latching portions which slide over the pins 29 to tightly clamp the two segments together as shown in Figure 2. When in this position, the springs 26 and 27 are under slight tension. The latches 26 and 27 also have extending ears which act as handles to aid in manipulating the latches into and out of latching position. It should be noted, however, that the latches do not extend beyond the periphery of the disk-like flanges providing the clutch faces, thus economizing on the required installation space.

The clutch faces of the armature 22 are each provided with a layer of paper as indicated at 31. This layer is preferably a good grade of rag paper and has a high co-efficient of friction even when the surface is fouled with oil. The layer of paper 31 is glued to each respective face with a water soluble oil-proof glue. When the glue has set, the surplus paper is cut off around the outer and inner circumferences of the clutch faces and is cut along the two segments. It will be seen that the distance between the clutch faces of the magnetic members 14 and 18 is just sufficient to accommodate the armature 22 (including the layers of paper 31), so that when neither of the magnet members is energized, the respective clutch faces will freely rotate relative to each other, and yet substantially no axial movement is required of the armature when the magnetic members are energized.

Whenever one of the magnet members is energized, the magnetic force will immediately clamp the clutch face of the segments 23 and 24 against the clutch face of that respective magnet member and cause each of the segments to act as a rigid part of that member and rotate therewith without slippage. The spring latches 26 and 27 will readily permit axial movement of each segment both individually and as a unit to provide for continual alignment of the clutch faces of the segments and respectively energized magnet member. Thus torsional force transmitted by the segment 24 to the segment 23 and hence through the key 25 to the shaft 11 will have an unappreciable resultant force tending to separate the segments 23. Hence the spring latches 26 and 27 will have to carry substantially none of the working load. Their main purpose is to maintain the segments in place when neither of the magnet members is energized.

In the event that foreign substances become lodged between the clutch faces of the armature and the magnet members and cause a deterioration of the layers of paper 31, it will only be necessary to remove the cover member 30 from the housing 10, rotate the shaft 11 until the ears of the latches 26 and 27 are in a position to be readily grasped, snap open the latches, and remove the segments radially of the shaft 11. It is preferable because of their inexpensiveness to have two armatures for each magnetic clutch. When one is in use the other may be re-papered and be held ready for immediate replacement when the paper on the one in use becomes damaged. After removing the damaged armature, the replacement armature is assembled in place by putting the segment 23 on the shaft with its key way on the key 25, putting the segment 24 on the shaft opposite to segment 23, and snapping the latches 26 and 27 into place over the pins 29. After the cover 30 is fitted on, the clutch is again in readiness for use. The damaged armature which has been removed may have the old paper soaked off and the new paper glued on as heretofore described.

Although only one embodiment of the invention is shown and described herein, it will be understood that this application is intended to cover such changes or modifications as come within the spirit of the invention or scope of the following claims.

I claim:

1. In a magnetic clutch, a revolvable shaft, a magnet rotatably mounted on said shaft, an armature carried by said shaft, said magnet and armature having cooperable clutch faces, said armature comprising a plurality of segments which fit together around said shaft, spring snap latches holding said segments together, and means providing a driving connection between one of said segments and said shaft.

2. In a magnetic clutch, a pair of oppositely revolving magnetic members, an armature, said members and said armature having cooperable clutch faces, one of two cooperable clutch faces having a layer of paper adhered thereto, and a shaft on which said members and armature are carried, said armature being formed of segments individually removable radially from said shaft.

3. In a magnetic clutch, a pair of oppositely revolving magnetic members, an armature, said members and said armature having cooperable clutch faces, one of two cooperable clutch faces having a layer of paper adhered thereto, and a shaft on which said members and armature are carried, said armature comprising a plurality of segments which are clamped together about said shaft.

4. In a magnetic clutch, a pair of oppositely revolving magnetic members, an armature, said members and said armature having cooperable clutch faces, one of two cooperable clutch faces having a layer of paper adhered thereto, a shaft on which said members and armature are carried, said armature comprising a plurality of segments which fit together around said shaft, and spring snap latches holding said segments together.

5. In a magnetic clutch, a pair of oppositely revolving magnetic members, an armature, said members and said armature having cooperable clutch faces, one of two cooperable clutch faces having a layer of paper adhered thereto, a shaft on which said members and armature are carried, said armature comprising a plurality of segments which fit together around said shaft, spring snap latches holding said segments together, and means providing a driving connection between one of said segments and said shaft.

6. In a magnetic clutch, a revolvable shaft, a magnet rotatably mounted on said shaft and having a clutch face, and an armature comprising a plurality of segments each provided with a clutch face independently cooperable with the clutch face of said magnet, means providing a driving connection between said armature and said shaft, and resilient means for holding said segments together while permitting independent axial movement thereof to align the oppositely related clutch faces, said segments being otherwise unrestrained against movement axially of said shaft.

7. In a magnetic clutch, a revolvable shaft, a magnet rotatably mounted on said shaft and having a clutch face, and an armature comprising a plurality of segments each provided with a clutch face independently cooperable with the clutch face of said magnet, means providing a driving connection between said armature and said shaft, and resilient means for holding said segments together, said last mentioned means being within the peripheral confines of said armature, said resilient means being disconnectible upon lateral movement thereof away from said shaft, said segments being directly removable from said shaft upon disconnection of said resilient means.

THEODORE MILLER.

REFERENCES CITED

The following references are of record in the file of this patent:

UNITED STATES PATENTS

| Number | Name | Date |
| --- | --- | --- |
| 1,325,011 | Fernow | Dec. 16, 1919 |
| 1,453,202 | Stevens | Apr. 24, 1923 |
| 2,102,318 | Hodgson | Dec. 14, 1937 |